United States Patent [19]

Giacoletto

[11] Patent Number: 4,499,392
[45] Date of Patent: Feb. 12, 1985

[54] HOMOPOLAR ALTERNATOR ELECTROMECHANICAL POWER CONVERSION MACHINE

[75] Inventor: Lawrence J. Giacoletto, Okemos, Mich.

[73] Assignee: Carol G. Heiser, Wilmington, Del.; a part interest

[21] Appl. No.: 514,610

[22] Filed: Jul. 18, 1983

[51] Int. Cl.³ ............................................. H02K 31/04
[52] U.S. Cl. .................................. 310/178; 310/168; 323/348
[58] Field of Search ....................... 310/178, 168, 166; 323/201, 348

[56] References Cited

U.S. PATENT DOCUMENTS

| | | |
|---|---|---|
| 960,383 | 6/1910 | Noeggerath . |
| 1,516,254 | 11/1924 | Towar ................................. 310/178 |
| 1,987,479 | 1/1935 | Japolsky ............................. 310/178 |
| 2,077,742 | 4/1937 | Chandeysson ...................... 310/178 |
| 2,633,545 | 3/1953 | Rieth ................................... 310/102 |
| 3,185,877 | 5/1965 | Sears ................................... 310/115 |
| 3,497,739 | 2/1970 | Appleton ............................ 310/178 |
| 3,518,474 | 6/1970 | Rebut et al. ......................... 310/178 |
| 3,521,099 | 7/1970 | Jewusiak ............................. 310/168 |

Primary Examiner—William H. Beha, Jr.
Assistant Examiner—D. L. Rebsch
Attorney, Agent, or Firm—Cushman, Darby & Cushman

[57] ABSTRACT

An electromechanical conversion machine includes a 1-turn transformer primary winding comprising a rotating conductive member electrically connected to a stator conducting member. The rotating member moves within an alternating magnetic field. A nonrotating electromagnetic core is positioned in operative relationship with the primary winding. The core is surrounded by a multiturn secondary winding circuit to which output terminals are connected.

18 Claims, 11 Drawing Figures

HOMOPOLAR ALTERNATOR ELECTROMECHANICAL POWER CONVERSION MACHINE

BACKGROUND OF THE INVENTION

In electromechanical systems there is a frequent need for a constant frequency electrical output from a variable speed mechanical input, or conversely, a need for a constant speed mechanical output from a variable frequency electrical input. Many methods for satisfying this need have been advanced. The present invention provides a solution using a homopolar (acyclic, Faraday) direct current (DC) machine, the field flux of which is varied continuously to produce an alternating current (AC) output. The frequency of the AC output is governed by the frequency of the field excitation and is independent of the shaft speed of the mechanical input.

A conventional separately-excited DC generator produces an AC electrical output if the separate field is excited with an AC current. However, if AC field excitation is used with a conventional DC generator with multi-turn armature and associated commutator, extensive sparking is present at the commutator. Significant power losses and excessive commutator wear are present and the resulting operation is not satisfactory. A homopolar (acyclic, Faraday) DC generator operates without commutation, so such a generator can readily be separately excited with AC current. Since the homopolar generator has only one armature turn, the AC electrical output is characterized by small voltage and large current.

The homopolar, or unipolar, DC machine was invented by Faraday in 1831. Regardless of its geometric form, the unipolar DC machine is characterized by a single turn rotor, so commutation is not required. Since it is a 1-turn DC machine, the rotor output voltage is small and the output current large.

There have been many inventions intended to circumvent the basic high-current problem of the unipolar DC machine. None of these inventions has proved commercially attractive, however, so the machine currently is used only for special low-voltage applications.

In U.S. Pat. No. 1,516,254 which issued on Nov. 18, 1924 to George S. Towar, a unipolar machine is disclosed which utilizes variable field excitation to produce AC output. The low-voltage AC output is connected to a transformer to obtain a high-voltage output from the transformer secondary. However, since the transformer primary current is so large, the connection between the unipolar machine and the transformer primary is of critical importance. To minimize electrical losses, the transformer primary connection must be made as short as feasible.

SUMMARY OF THE INVENTION

A primary objective of this invention is to reduce the electrical length of the transformer primary circuit to an absolute minimum by forming the transformer as an integral part of the unipolar alternator. This primary objective is achieved by operating the unipolar alternator output as a short-circuited turn to form a 1-turn transformer primary. The resulting unipolar alternator is somewhat similar to the pulse-operated homopolar generator described in U.S. Pat. No. 3,518,474 granted to Paul-Henri Rebut, et al on June 30, 1970. However, Rebut et al are concerned with pulse operation. Consequently, a switch must be introduced into the high-current transformer primary circuit and a short-circuited primary is not feasible. In contrast, in the present invention involving continuous AC operation, a short-circuited transformer primary circuit is employed, with a resulting unique design having highly attractive operating properties. More particularly, the present invention provides for:

an electromechanical power converter that can produce a constant-frequency electrical output from a variable-speed shaft mechanical input, or alternatively, can produce a constant-speed shaft mechanical output from a variable-frequency electrical input;

an electromechanical power converter which is rugged, has a large kilowatt/kilogram performance factor, and has an attractive conversion efficiency;

an electromechanical power converter which has a large power control ratio;

an electromechanical power converter with an integral transformer so as to provide a high-voltage, low-current electrical output;

an electromechanical power converter in which the transformer is designed with a primary circuit which minimizes electrical losses and which provides a transformer coefficient of coupling that is very near the ideal value of 1;

an electromechanical power converter designed to optimize the compromise between the electrical and magnetic properties of its components; and an electromechanical power converter which can be adapted readily to multiphase electrical operation.

DETAILED DESCRIPTION OF THE INVENTION

Further objects of the invention will become apparent from the following description of preferred embodiments of the invention which now will be set forth with reference to the accompanying drawings wherein.

Figure 1:
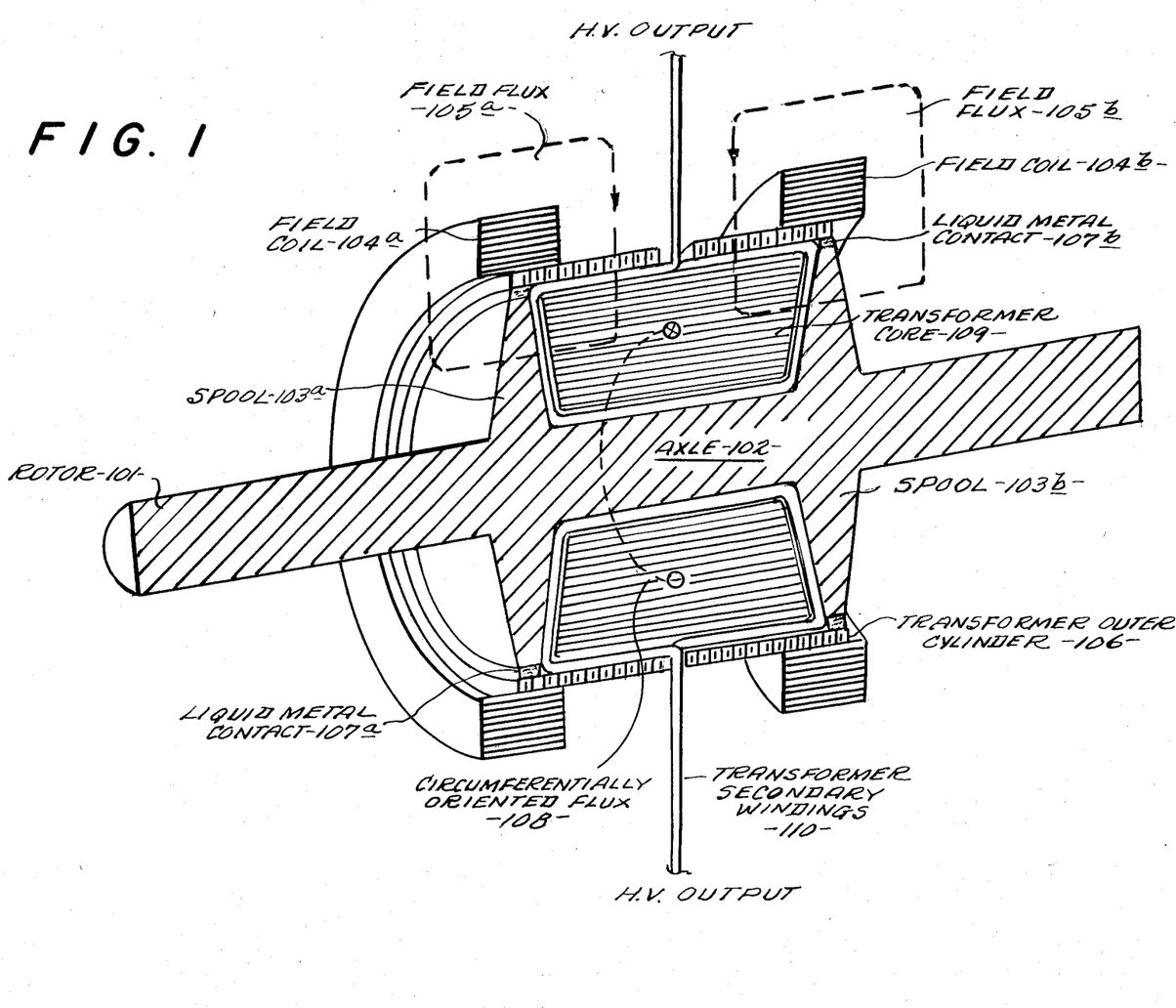
FIG. 1 is a sectional view in perspective of a homopolar alternator having a spool-type geometry.

The basic organization of the homopolymer alternator will be understood from the partial (field structure, rotor support, etc. omitted) cross-sectional view shown in FIG. 1 which represents the essential features of a spool-type embodiment of the invention. A separate rotary mechanical power source drives a rotor assembly 101. This assembly comprises an axle member 102 and two spool members 103a and 103b. Field coils 104a and 104b are connected to an AC voltage source (not shown) to produce separately-excited field magnetic flux, diagrammatically represented by field flux lines 105a and 105b. The field flux lines cut axially through the rotor spools 103a and 103b but in opposing directions. With the rotation of the spools at $S_o$ revolutions per second (rps), there are equal but oppositely poled peak voltages induced in each spool the magnitude ($V_1$) of which is expressed by the formula:

$$V_1 = S_o \phi_1$$

where $\phi_1$ = total peak flux (webers, Wb) that effectively penetrates through each spool face.

If the field coils produce a radially-averaged peak flux density of $B_1$ (teslas, T), then:

$$\phi_1 = \pi(R_3^2 - R_9^2) \times B_1$$

where $R_3$ = tip radius (meters, m) of the spool and $R_9$ = minimum effective radius (m) of the spool. In the FIG. 1 geometry, $R_9 \sim$ axle radius. Thus, as an example, if $R_3 = 0.1524$ m (6 inches), $R_9 = 0.01$ m (0.3937 inches), $B_1 = 1$ T, and $S_o = 100$ rps, then $\phi_1 = 0.07265$ Wb and $V_1 = 7.265$ volts peak for each spool, or 14.53 volts peak for both spools.

The spools 103a and 103b, together with axle 102 and a stationary transformer outer cylinder 106, form a 1-turn short-circuited transformer primary circuit, with an electrical connection between the rotating rotor member 101 and stator member 106 being provided by two toroidally-shaped liquid metal contacts 107a and 107b. With the completion of the electrical connection through the liquid metal contacts, AC current passes through the short-circuited primary turn, with the current flowing radially through the two spools and the liquid metal contacts, axially through the axle member 102 and also axially through the outer cylinder 106. This primary AC current of $I_1$ amperes (A) peak produces a circumferentially oriented peak flux of $\phi_c$ (Wb) shown diagrammatically as 108 through a stationary transformer core 109. A transformer secondary coil 110 of $N_o$ turns is would toroidally around the transformer core to produce an open-circuited secondary voltage $V_2$, the peak magnitude of which is expressed by the formula:

$$V_2 = 2\pi f \phi_c N_o$$

It is assumed that $\phi_c(t)$ is sinusoidal with a frequency of f (hertz, Hz) identically the same as the frequency of the voltage source connected to the field coils. Thus, as an example, if f = 60 Hz, $\phi_c = 0.0385$ Wb peak, and $N_o = 100$ turns, then $V_2 = 1451$ volts peak. Typically, the transformer secondary open-circuited voltage has a small phase shift $\theta_2$ (radians) with respect to the spool-induced voltage $V_1$.

If an electrical load corresponding to a resistance of 1 ohm is connected to the secondary, a secondary current of approximately 1451 A peak is produced with the load average power being about 1.053 megawatts. Under these circumstances, the transformer primary current would increase from about 300 A peak with no load to about 145,100 A peak with the 1-ohm load.

For a large power/mass performance factor, the elements of the unipolar alternator should be highly stressed both mechanically and electrically. Accordingly, the rotor speed $S_o$ should be made as large as possible. For mechanical strength, the spool width at the root should be made somewhat larger than the spool width at the tip as shown diagrammatically in FIG. 1.

A significant mechanical power loss arises from the viscous losses $P_1$ (watts, W) associated with the liquid metal contacts 107a and 107b of FIG. 1. These viscous losses can be approximately formulated as:

$$P_1 = 0.0225 \times \rho_M \times (\nu/\Delta r)^{\frac{1}{4}} \times (2\pi \times R_3 \times S_o)^{11/4} \times (4\pi \times R_3 \times Y_3)$$

where $\rho_M$ = density (kilograms/meter$^3$) of the liquid metal, $\nu$ = kinematic viscosity (meter$^2$/second) of the liquid metal, $\Delta r$ = radial width (meters) of the liquid metal, and $Y_3$ = spool tip width (meters). Appropriate liquid metals are mercury (Hg), 78 percent potassium + 22 percent sodium (NaK-78), and 76 percent indium + 24 percent gallium (GaIn-76). To minimize $P_1$, $Y_3$ should be made as small as feasible. With NaK-78, an operating tip current density of 30.9 megaA/m$^2$ is possible, so $Y_3$ can be made quite small, as for instance, $Y_3 = 5$ mm for the values as previously given. $P_1$ diminishes somewhat as $\Delta r$ is increased, but it is generally necessary to keep $\Delta r$ small, since otherwise magnetic forces acting upon the liquid metal force the liquid metal out of the annular gap. Viscous power losses can be decreased by using an inverted tip contact geometry such that the rotating member is outside of the stator member. Confinement of the liquid metal within the annular gap then becomes a more difficult problem. Under some operating conditions, to reduce viscous power losses and to promote heat transfer, it may be necessary to circulate the liquid metal by pumping as described in U.S. Pat. No. 2,828,431, granted on Mar. 25, 1958 to Peter A. Klaudy.

Figure 2:
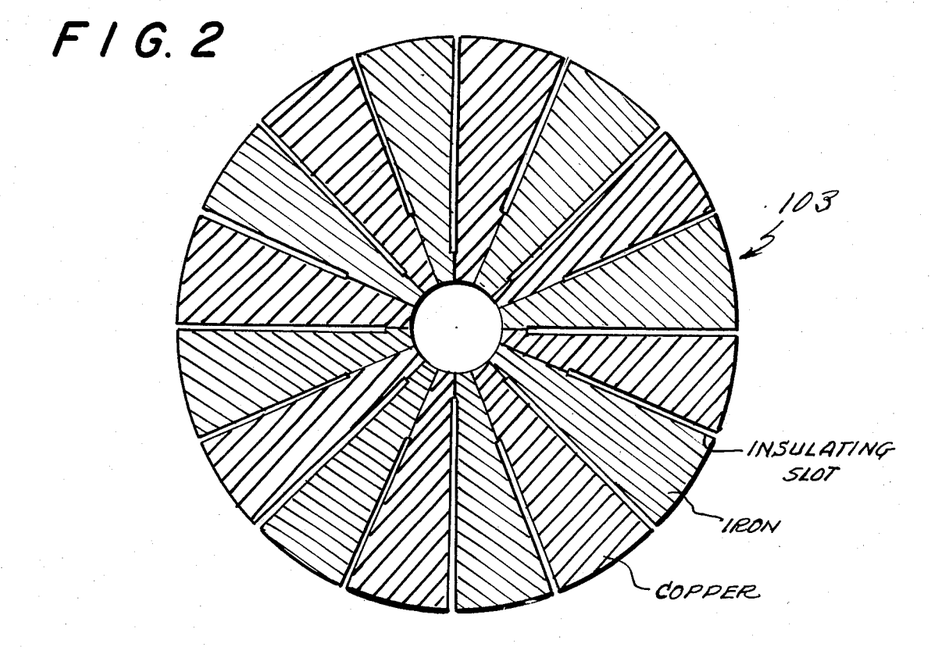
FIG. 2 is an end view of a spool employed in the embodiment of FIG. 1 and having alternating copper and iron wedges.
Figure 3:
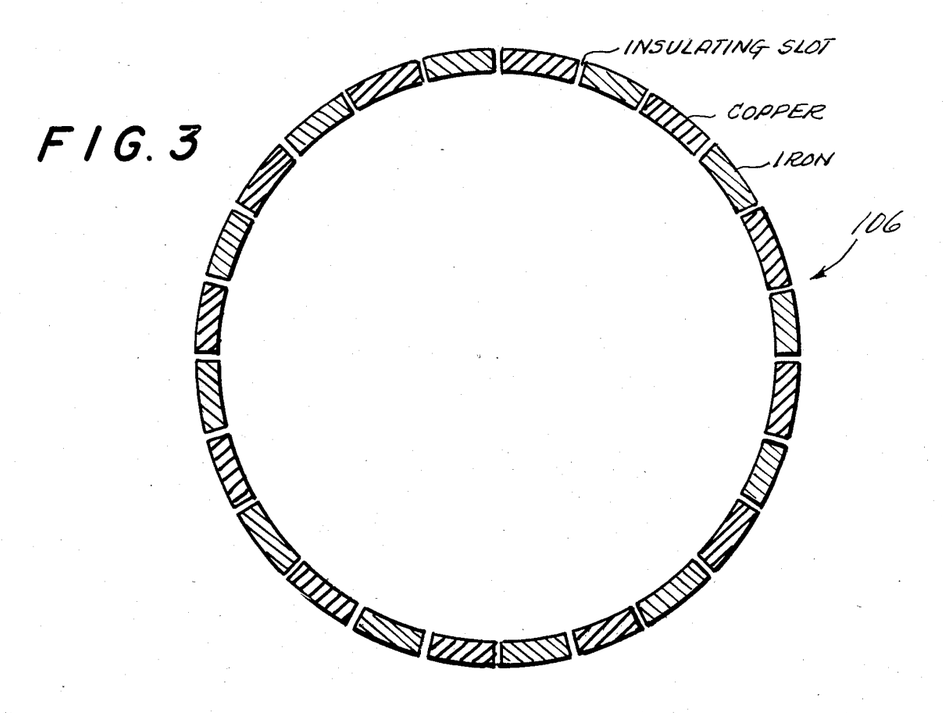
FIG. 3 is an end view of a transformer outer cylinder forming a portion of the embodiment of FIG. 1 and having alternating copper and iron cylindrical segments.

Eddy currents magnetically induced in the spools 103 and in the transformer outer cylinder 106 are a source of electrical power losses. To reduce this power loss, the spools can be divided into $N_2$ wedge-shaped segments, as illustrated in FIG. 2 wherein $N_2 = 16$. Similarly, eddy current power loss in the transformer outer cylinder can be reduced by dividing the cylinder into $N_3$ axial cylindrical segments, as illustrated in FIG. 3 wherein $N_3 = 24$. Eddy current power losses will diminish approximately inversely to the square of the number of segments. If the radial width $\Delta r$ of the liquid metal is significant, it may be necessary to divide the annular liquid metal ring into arc segments so as to reduce eddy currents within the liquid metal. Typical eddy current voltages are quite small, so the insulating slots for separating the individual segments of the spools, outer cylinder and liquid metal are very thin.

The spools 103 and cylinder 106 must provide both a good magnetic path (large permeability) and a good electrical path (large conductivity). Magnetic materials are not good electrical conductors and vice versa. Accordingly, a compromise between magnetic and electrical properties of the spools and cylinder is required. A compromise can be provided by using different thicknesses of magnetic and electrical materials or, as shown in FIGS. 2 and 3, by using alternating segments of different types, for example, iron (magnetic) and copper (electrical). The iron/copper ratio used depends upon design objectives. The adjacent segments in FIGS. 2 and 3 preferably are separated by a thin insulating slot, as discussed above. The 12 magnetic cylindrical segments in FIG. 3 extend axially, but need only extend over the axial length corresponding to the presence of significant magnetic flux. In order to optimize the magnetic and electrical properties of the cylinder 106, it may be advisable to form the alternating segments as approximately wedge-shaped segments in the axial direction.

The homopolar alternator shown diagrammatically in FIG. 1 uses the axle as part of the transformer primary short-circuited turn. For several reasons, this mode of operation may not be desirable. Accordingly, a copper inner transformer cylinder insulated from the axle may be introduced to complete the primary circuit. This inner cylinder has minimal involvement with magnetic flux. Therefore, it is preferably of copper, and it need not be segmented, as is the case for the outer cylinder. The axle radius required for the mechanical power generally is not large enough to provide sufficient circumference for the $N_o$ transformer secondary turns if the inner radius of the transformer core is minimally larger than the axle radius. With the minimum radius of the transformer core dictated by the circumference required for the $N_o$ transformer turns, a toroidal void is present. This void causes the transformer coefficient of coupling to be somewhat less than could be obtained if the transformer inner cylinder (111 of FIG. 4) radius is maximally increased.

Figure 4:
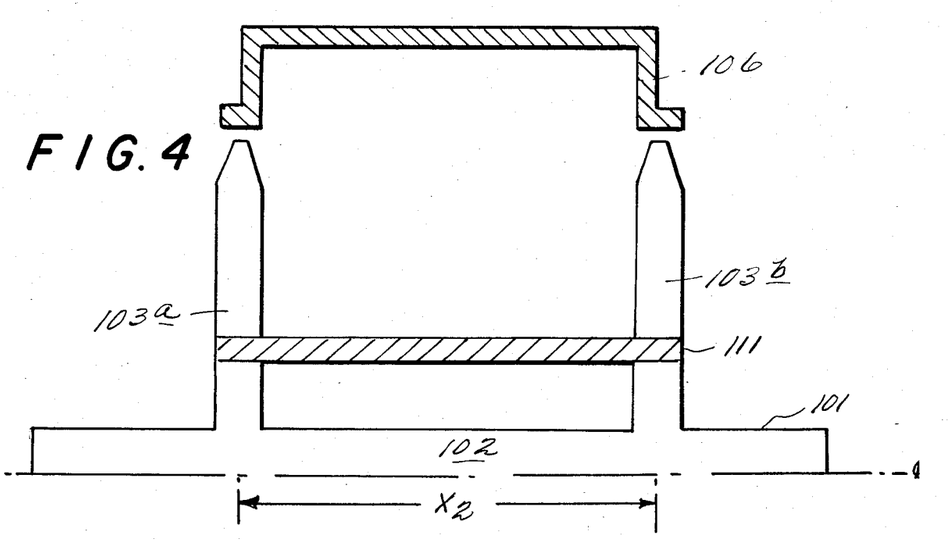
FIG. 4 is a sectional view of a portion of an alternative rotor to that shown in FIG. 1.

The magnetizing current flowing in the short-circuited transformer primary may be large enough to cause magnetic flux saturation in the core 109. Core saturation can be avoided by using a core magnetic material with a large saturation flux density, as for example, Permendur (a cobalt-iron alloy marketed by the Allegheny Ludlum Steel Corporation) with a saturation flux density of 2.45 T as compared to 2 T for silicon iron. Otherwise, core magnetic saturation can be avoided by increasing the core volume, as by increasing the axial separation $X_2$ between spool centers (FIG. 4) or by increasing the outer radius of the core. The form of the transformer outer cylinder 106 to accommodate a larger outer core radius is shown in FIG. 4. This outer cylinder can be sectioned in a manner similar to the cross section shown in FIG. 3. A less desirable way of decreasing the magnetizing current is by forming the primary circuit as a 2 or more-turn short-circuited coil. Such a construction is more complex, and the transformer coefficient of coupling is reduced sufficiently as to compromise the unipolar alternator operating properties. In some applications, core magnetic saturation can be avoided by reducing the field excitation with an associated reduction of the spool induced voltage. Also, in some applications the transformer core may be air, ferrite or other magnetic materials which do not exhibit flux saturation.

Figure 5:
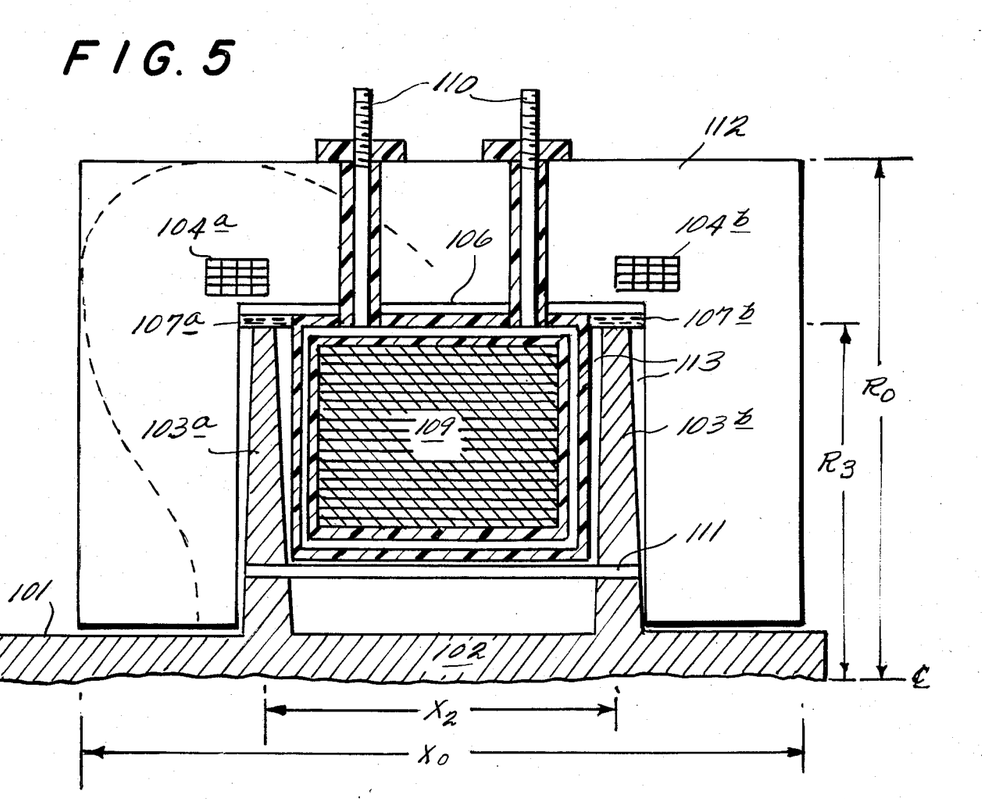
FIG. 5 is a sectional view of a portion of a spool-type unipolar alternator having a field structure and comprising an alternative embodiment to the alternator shown in FIG. 1.

FIG. 5 is an axial sectional view of a spool-type homopolar alternator with the field structure 112. To reduce magnetic power losses, the field structure 112 and the transformer core 109 are formed with thin tape laminations of silicon-iron or similar materials including, in some cases, ferrites. For an effective design, the field structure should be proportioned so the magnetic flux density is approximately uniform throughout. The appropriate proportions indicate that the following approximate relationships (FIG. 5) are appropriate:

$$X_2 = R_3;\ X_0 = 2R_3;\ \text{and}\ R_0 = \sqrt{2}\ R_3$$

The corners of the field structure 112 are of small utility. Accordingly, to reduce the mass of the structure, portions thereof may be removed, one such removal being represented by the dashed line of FIG. 5.

Preferably, the magnetic flux density through the active faces of the spools 103a and 103b is uniform. Distribution of the magnetic flux over the active faces of the spools can be controlled to some extent by design of the air gaps 113 between the internal integral transformer structure and the spool faces, and between the field structure and the spool faces.

To obtain further reduction of the mass of field structure 112, it can be eliminated in its entirety. In this event, the field coils 104a and 104b of the FIG. 5 embodiment must be made superconductors by cryogenic refrigeration. Otherwise, ohmic power loss in the field coils would be so prohibitively large as to prevent significant magnetic excitation.

Figure 6:
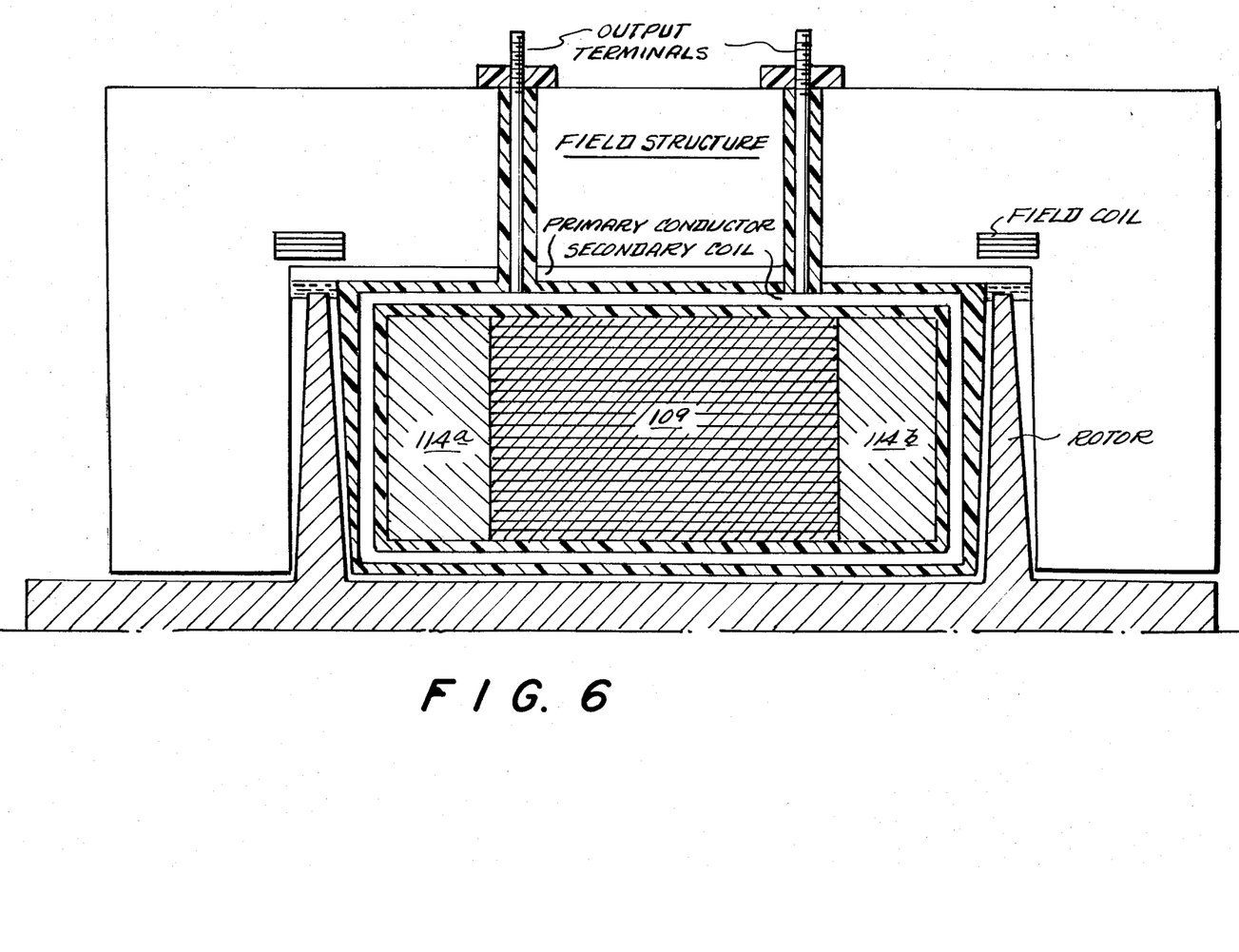
FIG. 6 is a sectional view of a portion of a spool-type unipolar alternator having a magnetically sectioned transformer core and comprising a still further alternative embodiment to the alternator shown in FIG. 1.

The magnetic flux present in the transformer core 109 of the FIG. 6 embodient has two orthogonal components: one, the axial and radial magnetic flux arising from the field coil excitation; and two, the circumferential magnetic flux arising from the primary circuit excitation. Except for effective design purposes, the two magnetic flux components need not share a common magnetic core. For some design purposes, end magnetic sections 114a and 114b can be introduced to optimally accommodate the first magnetic component. These end magnetic sections can be positioned either within the secondary coil as shown in FIG. 6 or positioned adjacent to the spools and not within the secondary coil, as shown in the further embodiment illustrated in FIG. 7.

In FIG. 6, two output terminals for the secondary coil are shown. Multiple terminals representing tap points off the secondary coil can be used if a number of different secondary voltages are required.

Figure 7:
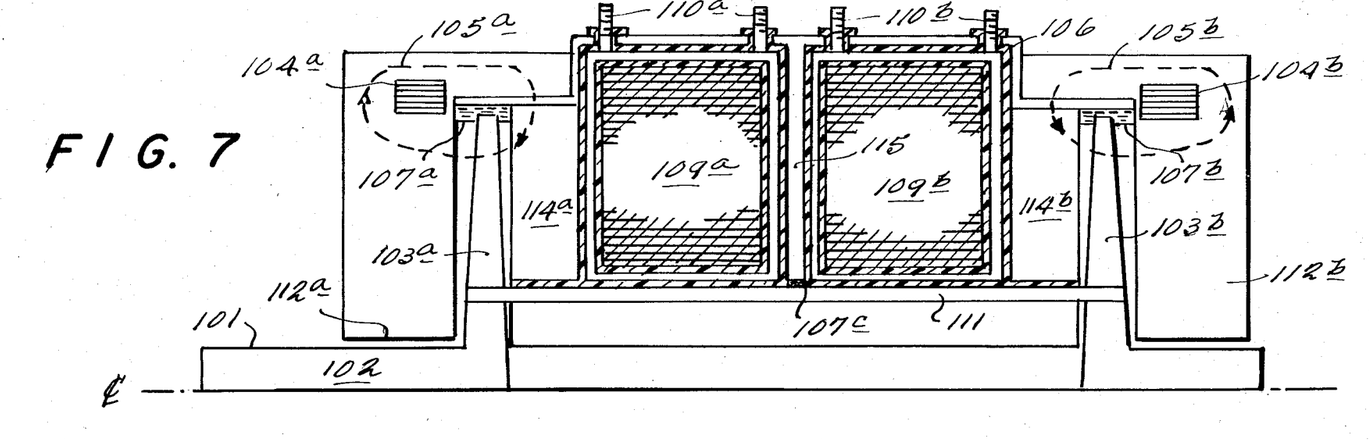
FIG. 7 is a sectional view of a portion of a dual spool-type unipolar alternator.

Multiple homopolar alternators can be field excited at the same frequency but with different phase angles to produce a multi-phase AC power source. As an example, two homopolar alternators can be field excited in quadrature to produce a 2-phase AC power source. The net mass of the system can be reduced by consolidating the two alternators into a single unit. The result is a geometry as shown in FIG. 7. Each alternator is formed by an "L" section consisting of one spool (103a, 103b). The outer circular cylinder 106 has a circular conducting element 115 at its midpoint to complete the primary electrical short circuit to the inner circular cylinder 111 via a liquid metal rotating contact 107c. Field coil 104a is excited with 0 degree phase A voltage, and field coil 104b is excited with 90-degree phase B voltage. Terminals 110a serve as the electrical output for phase A, and terminals 110b are the electrical output for phase B. This quadrature-phase excitation can be used to provide either a 2-phase output or a 3-phase output. A 3-phase output is obtained by using the well-known Scott connection. To implement a Scott-connected output, one of the outputs must have a center-tap output and have a net output voltage which is $2/\sqrt{3}$ times the second output voltage. Other types of phase transformations can be implemented, as for instance, a LeBlanc 2-3 phase connection, by using different secondary coil configurations.

The two spools of FIG. 7 need not be rotating at the same speed if the axle 102 and the inner circular cylinder 111 are separated at the mid-plane by a rotatable joint. Separate mechanical drives to each spool system can then be used.

Figure 8:
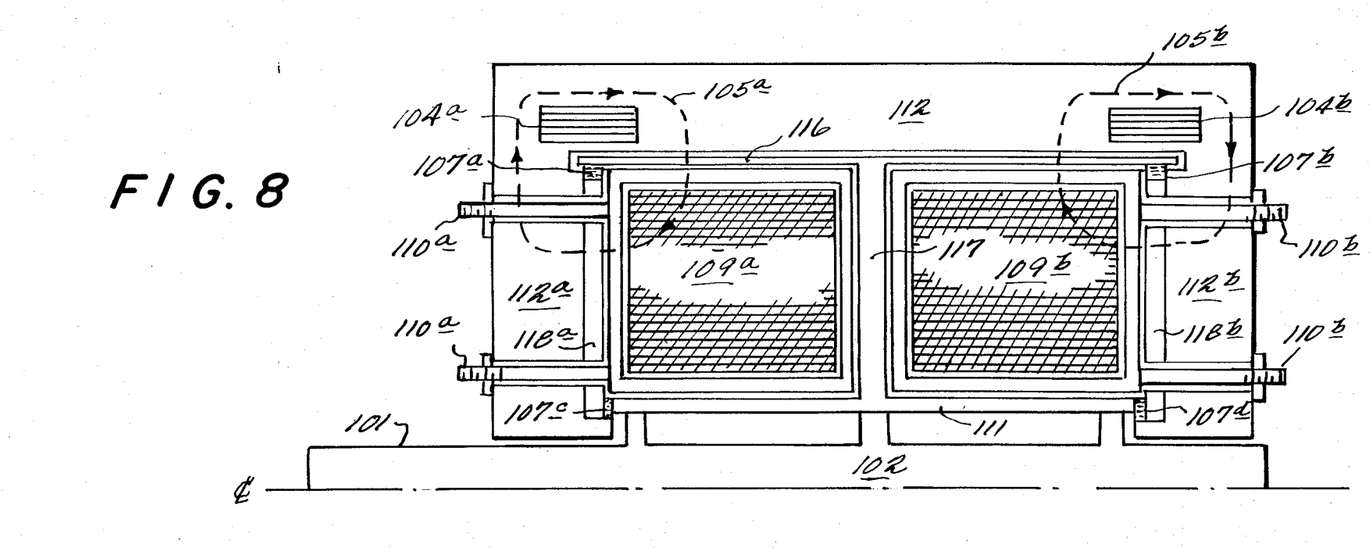
FIG. 8 is a sectional view of a portion of a dual cylinder-type unipolar alternator.

The preferred embodiment of the cylinder-type geometry of the unipolar alternator is shown in half axial section in FIG. 8. In FIG. 8 a dual-output unit is shown similar to the dual-output unit of FIG. 7. Elements of similar function are numbered as in FIG. 7 for ease of understanding. The cylinder-type geometry has voltage induced in a rotating cylindrical member, whereas in the spool-type geometry, as in FIG. 1, the voltage is induced in a rotating disc.

In FIG. 8, the rotating cylindrical member is labelled 116. Preferably, this outer cylindrical member is segmented with alternating magnetic and conducting segments as shown and explained with respect to FIG. 3. With separate excitations of field coils 104a and 104b, and with excitation phases A and B, which may be the same or different, individual voltages are produced in two ends of the rotating outer cylindrical conducting member 116. The individual induced voltages are short-circuited to form individual transformer primaries by the rotating disc conducting member 117, by the two ends of the rotating inner cylindrical conducting member 111, by the pairs of liquid metal contacts 107a–107c and 107b–107d, and finally by the stationary conducting discs 118a and 118b. These discs preferably are divided into a number of wedge segments as shown and described with respect to FIG. 2. Secondary coils are wound toroidally around transformer cores 109a and 109b with phase A output terminals 110a and phase B output terminals 110b provided. These terminals can be interconnected to provide, as desired, single-phase, two-phase, or three-phase outputs, as previously explained. The transformer cores 109a and 109b in FIG. 8 are shown as being formed by tape winding of thin lamination magnetic material to reduce magnetic power losses. The field structure 112, 112a, and 112b can be similarly formed. Alternatively, as previously discussed, the magnetic material may be ferrite or air with associated superconducting field coils.

Figure 9:
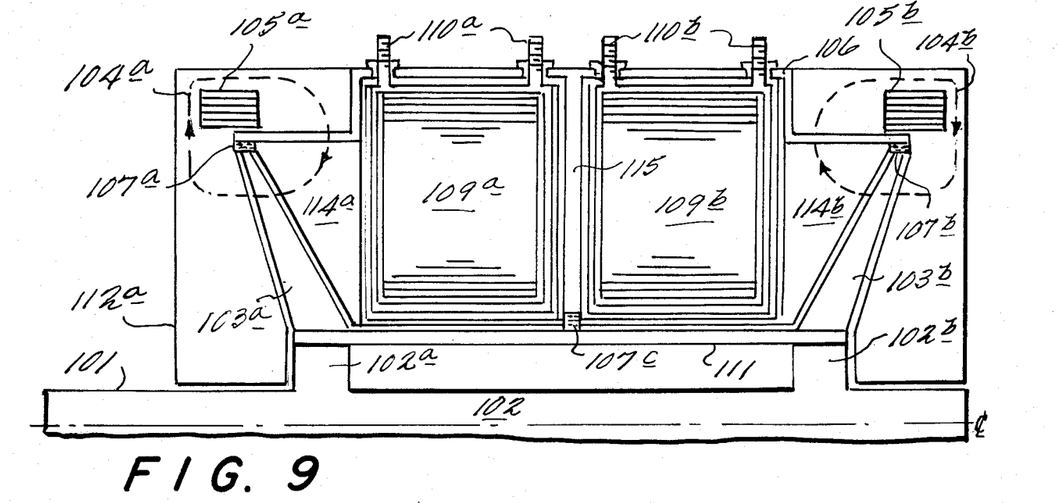
FIG. 9 is a sectional view of a portion of a dual cone-type unipolar alternator.

The preferred embodiment of a homopolar alternator with a cone-type geometry is shown in the half axial section comprising FIG. 9. In FIG. 9, a dual output unit is shown which is similar to the dual-output disc-type unit of FIG. 7. Elements of similar function are numbered as in FIG. 7 for ease of understanding. The cone-type geometry has operating properties that are intermediate the disc-type unit of FIG. 7 and the cylinder-type unit of FIG. 8. The cone-type geometry has voltages induced in rotating cone members 103a and 103b, as compared to voltages induced in the rotating disc members in FIG. 7. Preferably, these cone-shaped members 103a and 103b are formed with alternating magnetic and conducting wedge-shaped elements as shown in FIG. 2. The outer cylinder 106 need only be segmented with alternating magnetic and conducting segments (as shown in FIG. 3) at the two ends where there are magnetic flux lines present (shown diagrammatically as 104a and 104b). The center portion of outer cylinder 106 can be formed of fully conductive materials. The end magnetic sections 114a and 114b preferably are designed to have minimum magnetic power loss, as previously discussed, and have anisotropic magnetic properties with a large relative magnetic permeability for flux lines that are axially and radially directed, but with relative magnetic permeability as near unit as possible for flux lines that are circumferentially directed. The output terminals 110a and 110b may be interconnected to provide, as desired, single-phase, two-phase or three-phase outputs, as previously explained.

Figure 9A:
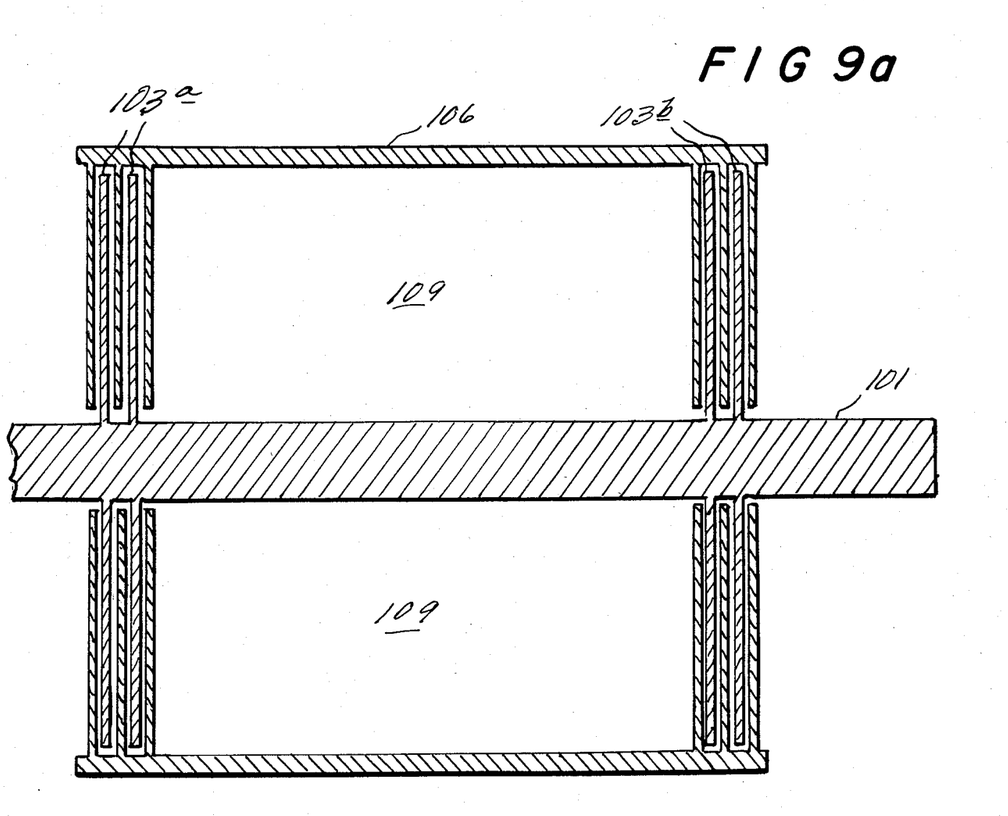
FIG. 9a is a sectional view of a portion of an alternative embodiment of a unipolar alternator utilizing capacitive connections in the transformer primary circuit.

The homopolar alternators shown in FIGS. 1, 5, 6, 7, 8 and 9 use conductive contacts between the rotating member and the stationary member which are movable. Even though liquid is employed as the contact material, significant viscous losses are introduced, especially as rotational speed is increased. It is possible to eliminate mechanical losses of moving contacts, however, by replacing them with a capacitive connection, as shown in partial detail in FIG. 9a for a spool-type geometry. The rotor spools 103a and 103b each are formed from multiple discs. These rotor discs are interleaved in spaced relationship with similar fixed discs attached to the stationary transformer outer cylinder 106 so as to form capacitor electrodes, thereby providing capacitive connections to complete the transformer primary circuit during operation of the device. Capacitive connection become especially attractive for unipolar alternator operation at high frequencies of field excitation and for high rotor speeds. The capacitive reactance that is introduced by the capacitive connections can be designed so as to compensate for the transformer primary circuit leakage inductive reactance, improving the transformer's electrical performance.

While the use of capacitive connections has been described relative to a spool-type transformer geometry, it will be appreciated that such connections also can be employed with unipolar alternators having cylindrical-type geometry, such as that illustrated in FIG. 8.

In some applications of the homopolar alternator, the AC field excitation may be provided by an electronic oscillator circuit operating from a suitable DC source in a manner well known to the art. In this event, an automatic frequency control (AFC) feedback loop can be provided to maintain the frequency of the unipolar alternator at precisely the desired frequency or to follow a predetermined frequency variation. Furthermore, the unipolar alternator AC output may be rectified to furnish DC power required by the electronic oscillator and AFC feedback loop. Residual magnetization in the field structure of the unipolar alternator may, under some operating conditions, provide self-starting conditions. Otherwise, a small amount of permanent magnetization can be introduced, or a rechargeable battery added, to effect self-starting conditions. An automatic voltage control (AVC) feedback loop may be introduced to maintain the magnitude of the AC voltage of the unipolar alternator at precisely the desired value, or have the magnitude follow some prescribed voltage variation.

The field coils of the homopolar alternator represent a highly inductive load to the field excitation source. It usually is desirable to tune-out this inductive reactance with capacitive reactance so as to present an approximate purely resistive load to the field excitation source. This conveniently can be accomplished by connecting a suitable capacitor in series (or in parallel) with the field coil. If the unipolar alternator is to be operated over a significant frequency range, the value of the capacitor required to tune out the field coil inductive reactance must be suitably changed. If manual switching is too slow, switching of capacitors by means of triacs, thyristors, or similar electronic trigger-type solid-state devices can be used as shown diagrammatically in FIG. 10. In this circuit, three triacs 119a, 119b, and 119c with associated capacitors 120a, 120b, and 120c are shown in series with the field coil 104 and the AC field coil excitation source. The triac gates 121a, 121b, and 121c are electronically triggered singly, in pairs, or all three simultaneously to provide seven different capacitance values to tune out the field coil reactance. Additional capacitor-triac combinations can be provided, if needed. Also, the capacitors can be switched into operation for different periods of time to provide an average capacitance value intermediate the seven different capacitance values.

Figure 10:
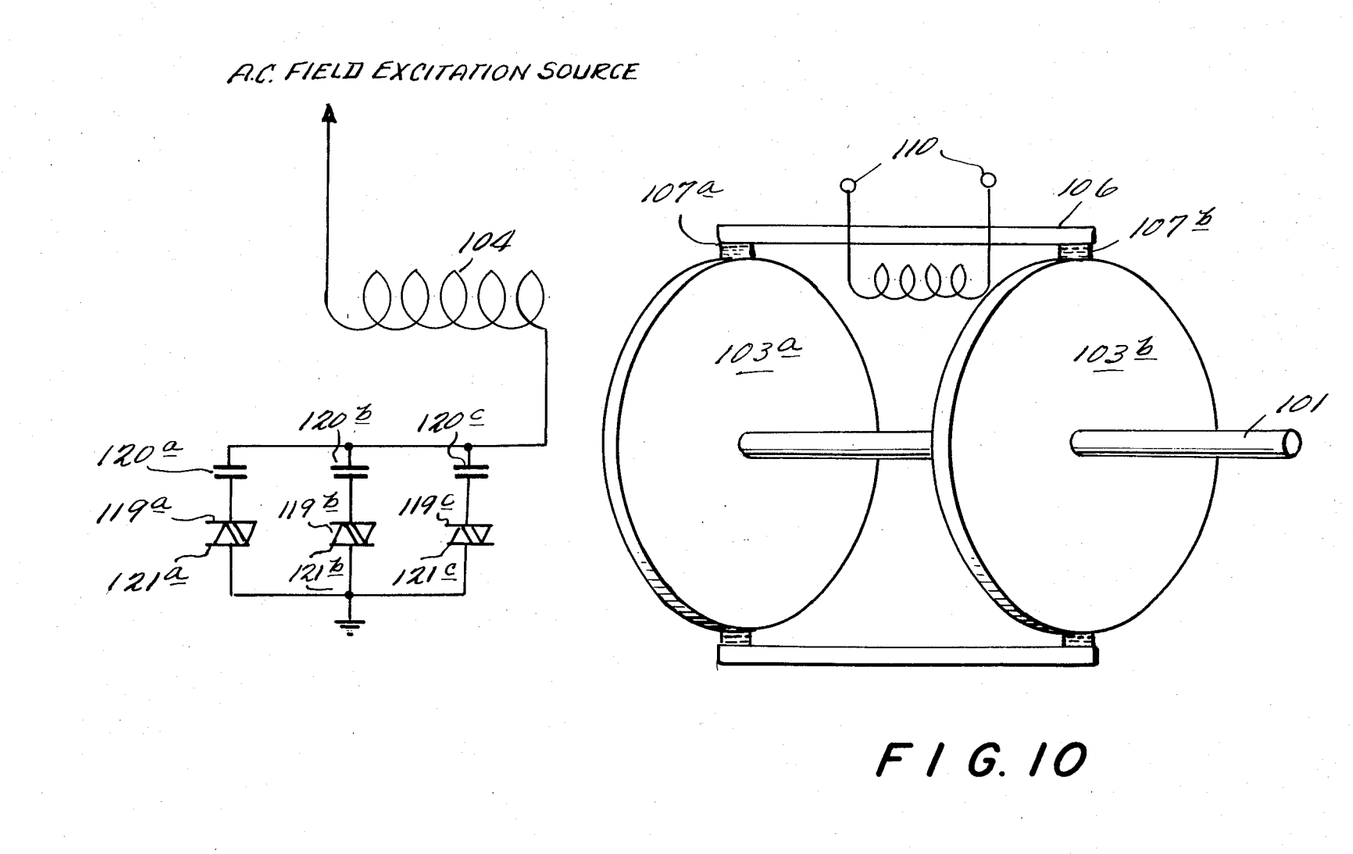
FIG. 10 is a circuit diagram illustrating triacs utilized to switch capacitances into the field excitation circuits of the various embodiments of the present invention.

Throughout this detailed description of the invention, the operation of the homopolar alternator has been described as an AC generator for conversion of mechanical rotary power into alternating current electrical power. However, it should be understood, as indicated in the above-identified U.S. Pat. No. 1,516,254, that the force interaction that occurs between the field excitation flux and the alternating current in the spools 103a and 103b of FIG. 1, or in the outer cylinder 116 of FIG. 8, can produce a motor action for conversion of transformer-input AC electrical power into mechanical rotary power of the shaft 101. To obtain motor action, the field coil current must be approximately in phase with the transformer primary current. Appropriate phase relationships can be obtained by means of capacitor tuning, as shown in FIG. 10. Accordingly, it also is a feature of this invention that bi-directional power conversion can be obtained by means of low-power electronic switching control using a circuit of the type shown in FIG. 10, or by manual means.

What is claimed is:

1. An electromechanical conversion machine which comprises, in combination:
   an electrical conducting member of circular symmetry rotating in an alternating magnetic field;
   a field coil with alternating electrical excitation for producing said field;
   a stator conducting member electrically connected to the rotating member in such a manner as to form with said rotating member a continuous electrical conducting transformer primary circuit;
   a nonrotating magnetic core of toroidal shape positioned within said continuous electrical circuit and magnetically coupled therewith;
   a multiturn secondary circuit formed around, but insulated from, said magnetic core so as to be magnetically coupled to the alternating magnetic field produced therein; and
   output terminals joined to said secondary circuit.

2. An electromechanical conversion machine according to claim 1, wherein said rotating member comprises at least one disc-shaped electrical conducting spool member rotating in the alternating magnetic field.

3. An electromechanical conversion machine according to claim 2, wherein the disc-shaped electrical conducting spool member is formed by at least two alternating segments of different classes of materials electrically insulated from one another, one class being highly permeable to magnetic flux lines but having small electrical conductivity and the other class having large electrical conductivity but being of small magnetic permeability.

4. An electromechanical conversion machine according to claim 1, wherein the stator conducting member comprises at least two alternating segments of different classes of materials electrically insulated from one another, one class being highly permeable to magnetic flux lines but having small electrical conductivity and the other class having large electrical conductivity but being of small magnetic permeability.

5. An electromechanical conversion machine according to claim 1, wherein the rotating member includes an inner conducting cylinder positioned between an axle of the machine and an outer conducting cylinder which comprises said stator conducting member.

6. An electromechanical conversion machine according to claim 5, wherein the outer conducting cylinder is of varied radii as a function of the axial position, the cylinder radius being largest at the axial midpoint of the machine and being smallest at the two axial ends where electrical contact is made to the rotating member.

7. An electromechanical conversion machine according to claim 1, wherein the field coil is formed to accommodate a liquid coolant having a temperature as low as cryogenic levels.

8. An electromechanical conversion machine according to claim 1, wherein the nonrotating magnetic core is formed of magnetic materials exhibiting differing characteristics.

9. An electromechanical conversion machine according to claim 2, wherein at least two spool members, each having an associated secondary circuit, operate in association with a single rotating conducting member.

10. An electromechanical conversion machine according to claim 1, wherein said rotating member comprises at least one cylindrical-shaped electrical conducting member rotatable about the cylinder's axis and in alternating magnetic fields produced by at least one associated field coil having alternating electrical excitation to produce said alternating magnetic fields.

11. An electromechanical conversion machine according to claim 10 wherein the cylindrical-shaped electrical conducting member comprises at least two alternating segments of different classes of materials electrically insulated from one another, one class being highly permeable to magnetic flux lines, but having small electrical conductivity and the other class having large electrical conductivity but being of small magnetic permeability.

12. An electromechanical conversion machine according to claim 1, with auxiliary electrical components added to the field coil so as to reduce the net circuit reactance presented to an AC field excitation source with additional electronic means to maintain the field coil circuit approximately resistive independent of the frequency of the AC field excitation source.

13. An electromechanical conversion machine according to claim 12, wherein the electronic means for changing the added reactance are used to control the bidirectional transformation of mechanical and electrical powers.

14. An electromechanical conversion machine according to claim 1, wherein said rotating member comprises at least one cone-shaped electrical conducting member rotatable in alternating magnetic fields produced by at least one associated field coil having alternating electrical excitation to produce said alternative magnetic fields.

15. An electrical conversion machine according to claim 14, wherein the cone-shaped electrical conducting member comprises at least two alternating segments of different classes of materials electrically insulated from one another, one class being highly permeable to magnetic flux lines but having small electrical conductivity and the other class having large electrical conductivity but being of small magnetic permeability.

16. An electromechanical conversion machine according to claim 1, with electrical contact between the rotating and stator members being made with material that become liquid at the machine operating temperature.

17. An electromechanical conversion machine according to claim 1, wherein the multiturn secondary conducting circuit is formed with conductors of varying cross-sectional areas and shapes thereby minimizing the secondary resistance and producing a nearly ideal magnetic coefficient of coupling between primary and secondary circuits.

18. An electromechanical conversion machine according to claim 1, wherein said electrical connection between the stator conductng member and the rotating member is a capacitive connection.

* * * * *